United States Patent [19]
Gleeson et al.

[11] Patent Number: 5,959,989
[45] Date of Patent: *Sep. 28, 1999

[54] SYSTEM FOR EFFICIENT MULTICAST DISTRIBUTION IN A VIRTUAL LOCAL AREA NETWORK ENVIRONMENT

[75] Inventors: Bryan J. Gleeson, Cupertino; Percy P. Khabardar; Norman W. Finn, both of San Jose, all of Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/882,632

[22] Filed: Jun. 25, 1997

[51] Int. Cl.$^6$ .................................................. H04L 12/46
[52] U.S. Cl. ......................... 370/390; 370/401; 370/432
[58] Field of Search .................................. 370/390, 397, 370/449, 389, 469, 432, 395, 400, 401, 409, 270

[56] References Cited

U.S. PATENT DOCUMENTS

| | | | |
|---|---|---|---|
| 4,864,559 | 9/1989 | Perlman | 370/390 |
| 4,922,486 | 5/1990 | Lidinsky et al. | 370/60 |
| 5,304,992 | 4/1994 | Herashima | 370/390 |
| 5,305,311 | 4/1994 | Lyles | 370/390 |
| 5,361,256 | 11/1994 | Doeringer et al. | 370/390 |
| 5,394,402 | 2/1995 | Ross | 370/402 |
| 5,511,168 | 4/1996 | Perlman et al. | 370/409 |
| 5,612,959 | 3/1997 | Takase et al. | 370/390 |
| 5,633,869 | 5/1997 | Burnett et al. | 370/396 |
| 5,684,800 | 11/1997 | Dobbins et al. | 370/401 |
| 5,740,171 | 4/1998 | Mazzoca et al. | 370/401 |
| 5,742,604 | 4/1998 | Edsall et al. | 370/401 |
| 5,752,003 | 5/1998 | Hart | 395/500 |
| 5,764,636 | 6/1998 | Edsall | 370/401 |

OTHER PUBLICATIONS

Lucent Technolgies Inc.'s Initial Disclosure of Prior Art Under Civil Local Rule 16–7, Case No. C98–20826 JW (PVT) ENE (Nov. 18, 1998).
M. Seaman and D. Delaney, *Single or Multiple Filtering Databases* (May 8, 1997).
IEEE, "Draft Standard for Virtual Bridged Local Area Networks", pp. 1–10 and 70–72 (May 1997).
S. Deering and D. Cheriton, *Multicast Routing in Datagram Internetworks and Extended LANs*, vol. 8, "ACM Transactions on Computer Systems", pp. 85–110 (May 1990).
S. Deering et al., *An Architecture for Wide–SArea Multicasting*, Proceedings of SIGCOMM '94 Conf., ACM, pp. 126–135 (Oct. 1994).

Primary Examiner—Chau Nguyen
Assistant Examiner—K. Vanderpuye
Attorney, Agent, or Firm—Cesari and McKenna, LLP

[57] ABSTRACT

A mechanism for efficiently distributing multicast messages having group destination addresses to subscribing entities in a computer network. The network includes a plurality of virtual local area network (VLAN) designations among those entities and a multicast network device (MND) configured to generate at least one unique multicast (MVLAN) identifier (ID) for each group destination address. Each MVLAN ID encompasses all VLAN designations of the subscribing entities, except for the VLAN designation associated with the entity sourcing the message. Each MVLAN ID is propagated to intermediate devices of the network and attached to subsequent multicast messages to enable efficient distribution of those messages over the network.

29 Claims, 8 Drawing Sheets

| GROUP DESTINATION ADDRESS | SUBSCRIBING VLAN, PORT NUMBER |
|---|---|
| NEWSFROM27 | GREEN, 2<br>RED, 3<br>BLUE, 3<br>GREEN, 3<br>ORANGE, 3<br>ORANGE, 4<br>RED, 5 |
| ------- | -------- |
| ------- | -------- |

FIG. 2C

| PORT NUMBER | VLAN DESIGNATION | ENTITY MAC ADDRESSES |
|---|---|---|
| 1 (INTERNAL) | RED | 27 |
| 2 (INTERNAL) | GREEN<br>BLUE-GREEN | 28 |
| 3 (EXTERNAL) | RED<br>BLUE<br>GREEN<br>ORANGE<br>YELLOW<br>BLUE-GREEN<br>ORANGE-YELLOW | |
| 4 (INTERNAL) | ORANGE<br>ORANGE-YELLOW | 30 |
| 5 (INTERNAL) | RED | 29 |

FIG. 2B

SYSTEM FOR EFFICIENT MULTICAST DISTRIBUTION IN A VIRTUAL LOCAL AREA NETWORK ENVIRONMENT

FIELD OF THE INVENTION

The present invention relates generally to the distribution of messages in a computer network environment and, more specifically, to the efficient distribution of multicast messages.

BACKGROUND OF THE INVENTION

Many organizations, including businesses, governments and educational institutions, utilize computer networks in order to share and exchange information. A computer network typically comprises a plurality of entities interconnected by means of a communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack).

In many instances, several LANs may be interconnected by point-to-point links, microwave transceivers, satellite hook-ups, etc. to form a wide area network ("WAN") or subnet that may span an entire country or continent. One or more network devices are often used to couple LANs together and allow the corresponding entities to exchange information. For example, a network switch may be utilized to provide a "switching" function for transferring information, such as data packets, among entities of a computer network. Typically, the switch is a computer and includes a plurality of ports that couple the switch to the other entities. The switching function includes receiving data at a source port from an entity and transferring that data to at least one destination port for receipt by another entity.

Another network device is referred to as a router. A router is often used to interconnect LANs executing different LAN standards and/or to provide higher functionality than the switches, such as efficient message routing. To perform these tasks, a router, which is also often a computer, typically examines the destination address and source address of all packets passing through the router. Routers typically operate at the network layer of the protocol stack, such as the Transmission Control Protocol/Internet Protocol ("TCP/IP") reference model. If the LAN standards associated with the source entity and the destination entity are dissimilar (e.g., Ethernet and Token Ring), the router may alter the format of the packet so that it is in conformance with the standard corresponding to the destination entity.

An arrangement that is capable of associating any port of a switch with any particular segregated network group is disclosed in U.S. Pat. No. 5,394,402, issued on Feb. 28, 1995 to Floyd E. Ross (the "'402 Patent"). According to the '402 Patent, any number of physical ports of a particular switch may be associated with any number of groups within the switch by using a virtual local area network (VLAN) arrangement that virtually associates the port with a particular VLAN designation. Specifically, Ross discloses a switch or hub for a segmented virtual local area network with shared media access that associates VLAN designations with at least one internal port and further associates those VLAN designations with messages transmitted from any of the ports to which the VLAN designation has been assigned. The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated.

In many cases, it may be desirable to interconnect a plurality of these switches in order to extend the VLAN associations of ports in the network. Ross, in fact, states that an objective of his VLAN arrangement is to allow all ports and entities of the network having the same VLAN designation to interchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment.

FIG. 1A illustrates a conventional computer network 100 comprising a plurality of LANs 101–115. The LANs 101–115, moreover, are interconnected by a plurality of switches 117–122. More specifically, each LAN 101–115 is preferably coupled to a specific internal port 116 of switches 117–122. The network 100 may also include a plurality of routers 123, 124, such that a router (e.g., router 123) is associated with a given segment of the network 100 (e.g., LANs 101–108). Switches 117–122 and routers 123, 124 are typically interconnected by trunk lines 128–133, which may be point-to-point links. Trunk lines 128–133 are typically coupled to specific external ports 125 of switches 117–122 and routers 123, 124.

Utilizing the system disclosed in the '402 Patent, various LANs may be grouped together to form VLANs. As shown in FIG. 1A, each VLAN may be identified by a color code, e.g., "R" for red, "B" for blue, "G" for green, "Y" for yellow and "O" for orange. More specifically, switches 117–122 associate each internal port 116 with at least one VLAN color tag. For example, switches 117 and 119 may each associate their ports coupled to LANs 102, 103 and 107 with the "red" VLAN designation, thereby grouping these LANs together. Since all entities located on a given LAN (e.g., LAN 102) utilize the same shared port 116 of the corresponding switch 117, moreover, each of these entities is also associated with the VLAN designation(s) assigned to that port (e.g., red).

Each external port 125 of switches 117–122 is similarly associated with one or more VLAN designation(s). The VLAN designations associated with external ports 125 correspond to the VLANs that are reachable through that external port 125. For example, switch 117 may associate its one external port 125 with the red VLAN designation, among others, to reflect that one or more LANs (e.g., LAN 107) associated with the red VLAN designation is "behind" that port.

To identify the various VLAN designations defined throughout the network 100, switches 117–122 and routers 123, 124 typically participate in a VLAN configuration protocol. In accordance with the protocol, each switch 117–122 periodically transmits information regarding the VLAN designation(s) assigned to its internal ports 116. Upon receipt, the other switches 117–122 typically utilize this information to assign VLAN designations to their external ports 125.

As set forth in the '402 Patent, any entity associated with the red VLAN designation may exchange messages with any other similarly designated entity, even though the two entities may be physically remote from each other and associated with switches that are coupled to other VLANs. For example, assume that entity 17 which is coupled to a "red" internal port 116 at switch 117 wishes to send a message (i.e., a unicast message) to entity 18 coupled to a "red" port at switch 119. As shown in FIG. 1B, entity 17 generates a message 150, which typically includes a start flag 151, a destination address 152 (corresponding to entity 18), a source address 154 (corresponding to entity 17), information 156 comprising the message and an end of message flag 158. Entity 17 then drives message 150 on the corresponding LAN 103.

Switch 117 receives the message on an internal port 116 associated with the red VLAN and, as shown in FIG. 1C, attaches a red VLAN designation field 160 to the message 150. Although the VLAN designation 160 is shown appended to the message 150, those skilled in the art will understand that it may be attached at any point within the message. Switch 117 also examines the destination address (entity 18) and determines that network entity 18 is not coupled to an internal port 116 of switch 117, but that its one external port 125 is associated with the red VLAN designation, among others. Accordingly, switch 117 drives message 150 with VLAN designation 160 onto port 125. Switch 117 may additionally encapsulate message 150 for transmission over trunk 128.

Message 150 is next received at switch 118. Since the only port on switch 118 associated with the red VLAN designation (other than the port on which the message arrived) is its second external port 125 (corresponding to trunk 129), the message 150 is switched to that port for transmission to switch 119. Upon receiving the message, switch 119 examines the VLAN designation 160 and destination address 152 and determines that it corresponds to entity 18 which resides on LAN 107. Switch 119 further determines that "red" VLAN designation of the message 150 matches the designation associated with the internal port 116 coupled to LAN 107. Accordingly, switch 119 strips off the VLAN designation field 160 and drives message 150 onto internal port 116 coupled to LAN 107.

To improve the flexibility of network 100, it is desirable to support the transmission of message to a predefined group of entities, including entities of diverse VLAN designations. Such a message is known as a group multicast message. For example, a group of entities (e.g., entities 18–25) may wish to receive certain types of messages originating from entity 17. These entities typically register with one or more multicast routers (e.g., router 123) which controls the transmission of messages across VLAN boundaries. Router 123 may employ a security mechanism to prevent entities having a particular VLAN designation from subscribing to multicast messages to which they not entitled.

Registration may be accomplished via the Internet Group Management Protocol (IGMP) which defines operations that may be used by entities to join a group (e.g., JoinGroup). To limit the amount of traffic, only one entity per LAN typically transmits such a request. Other interested entities will rely on the first subscription request to cause the message to be delivered to the LAN, thereby making it available to all interested entities. The switches may perform additional filtering such that router 123 receives only one subscription request per VLAN. In response, router 123 creates a subscription list (not shown) associating each group multicast address with the list of VLANs on which at least one subscribing entity resides. Thereafter, entity 17 utilizes this group destination address to send multicast messages to the subscribing entities.

Switches 117–122 may also monitor the IGMP messaging between entities and multicast router 123 to learn which ports 116, 125 lead either to a router or to at least one entity subscribing to a particular group multicast address. As discussed above, however, switches 117–122 may not exchange messages between segments of the network 110 associated with different VLAN designations (e.g., between entities associated with the red and blue VLANs). To support cross-VLAN traffic, switches 117–122 deliver all multicast messages to the multicast router 123.

Entity 17 generates a multicast message by entering the predefined group multicast address in the destination address field 152 (FIG. 1B). The multicast message is then driven on LAN 103 and received by switch 117. As with unicast messages, switch 117 attaches the corresponding VLAN designation 160 associated with the port 116 on which the message was received. Switch 117 also determines that the message is a group multicast message and (assuming the switch participates in IGMP) accesses its subscription list to determine which internal and external ports 116, 125 are associated with this address. Since only LAN 103 and trunk 128 are associated with this group multicast address and the message was received from LAN 103, switch 117 drives the message onto trunk 128 via external port 125 where it is received by switch 118.

Switch 118 examines the destination address of the message and its own subscription list which indicates that LAN 106 and trunks 128 and 129 are associated with this group multicast address. The "red" VLAN designation of the message, however, does not match the "blue" VLAN designation associated with the internal port 116 coupled to LAN 106 and thus switch 118 is precluded from forwarding the message onto this internal port 116. Furthermore, since the message was received on trunk 128, switch 118 simply drives the message onto its external port 125 coupled to trunk 129.

Switch 119 receives the message, examines the VLAN designation and destination address and determines that LAN 107 and trunks 129 (on which the message was received), 130 and 131 are associated with this group multicast address. Here, the red VLAN designation of the message matches the VLAN designations associated with port 116 coupled to LAN 107 and with port 125 coupled to trunk 130, but not with port 125 coupled to trunk 131. Accordingly, switch 119 strips off the VLAN designation field 160 and forwards the message onto internal port 116 for transmission over LAN 107. Switch 119 also drives the message with the VLAN designation field 160 on its external port 125 coupled to trunk 130 for receipt by multicast router 123.

Multicast router 123 examines the message and determines that it is a "red" multicast message from entity 17. Router 123 accesses its subscription list and determines this group multicast address is associated with the red, blue, green, yellow and orange VLANs. Since the VLAN designation of the message matches one of the associated VLANs (i.e., red), router 123 presumes that message has already been delivered to the subscribers on that VLAN (e.g., entity 19). That is, switches 117–122, as described above, are able to deliver multicast messages in which the VLAN designation of the message matches the VLAN designation of the subscribing entities. Thus, multicast router 123 need not forward multicast messages to the same VLAN designation as the sourcing entity. Because switches 117–122 were precluded from forwarding the multicast message across non-matching VLANs, router 123 proceeds to forward the message to those VLANs (i.e., the blue, green, orange and yellow VLANs).

To deliver multicast messages to subscribers of diverse VLAN designations, router 123 must create a separate message for each of the remaining VLAN designations. That is, router 123 creates four identical copies of the message, each with a different VLAN designation attached thereto (i.e., blue, green, yellow and orange). Each copy is then sent out on the network 100 by router 123.

As these messages are received by the switches 118–122, they are directed to internal ports associated with the corresponding blue, green, yellow or orange VLAN designations to which a subscribing entity is coupled. That is, the first copy having the blue VLAN designation is received and sent out by switch 118 on the "blue" port 116 coupled to LAN 106 (for receipt by entities 19 and 20). The second copy is forwarded by switch 119 on its "green" port 116 coupled to LAN 108 for receipt by entity 21. Similarly, the third copy of the message is delivered to entities 22 and 23 associated with the yellow VLAN at switch 120 and the fourth copy to entities 24 and 25 associated with the orange VLAN at switches 120 and 122. In this manner, the message is transmitted to all LANs on which at least one subscribing entity resides.

Although the prior art arrangement as described above is capable of delivering multicast messages to entities of diverse VLAN designations, it nonetheless has certain disadvantages. First, the arrangement requires that the same message be copied multiple times by the multicast router; one copy for each VLAN associated with the message, In addition, each copy must be placed on the trunk line(s) linking the multicast router to the computer network. Depending on the number of VLAN designations associated with a given group multicast address, this may severely compromise the throughput on this trunk line. Multicast messaging may thus subject the network to substantial performance penalties, limiting the benefits of having established virtual local area networks.

SUMMARY OF THE INVENTION

It is an object of the present invention to provide an efficient mechanism for distributing multicast messages.

It is a further object of the present invention to provide an efficient mechanism for distributing multicast messages in a virtual local area network environment.

It is a further object of the present invention to reduce the number of messages that must be sent to accomplish multicasting.

The invention relates to a mechanism for efficiently distributing multicast messages to subscribing entities via group multicast addresses in a computer network having a plurality of virtual local area network (VLAN) designations among those entities. The mechanism comprises a multicast network device (MND) configured to generate a multicast VLAN (MVLAN) identifier (ID) for each unique combination of VLANs to which any multicast group address is to be directed. The MVLAN ID preferably encompasses all VLAN designations of the entities subscribing to a multicast message stream, except for the VLAN designation of the entity or entities sourcing the multicast messages, The MVLAN ID, along with its corresponding VLAN designations, is then propagated to intermediate devices of the network and attached to subsequent multicast messages to enable efficient distribution of those messages over the network.

In the illustrative embodiment, the MND coordinates distribution of multicast messages by storing associations of VLAN designations and group multicast addresses. Associations are entered when the MND receives a subscription request across a VLAN on which at least one subscribing entity resides and deleted when the MND receives corresponding cancellation requests. An entity preferably comprises a host computer that sends and/or receives information over the network. Thereafter, the MND examines the VLAN designations associated with each group multicast address and accesses a multicast VLAN tag source to establish at least one MVLAN ID for use in distributing messages to those associated VLANs. The MVLAN ID with its corresponding VLAN designations is then propagated to the intermediate devices via advertisement messages over the network. An intermediate device preferably comprises a switch for forwarding information, including the multicast messages, to the entities.

In response to the advertisements, the intermediate devices modify their VLAN association tables in order to associate the MVLAN ID with its corresponding VLAN designations for subsequent multicast message handling. That is, each intermediate device updates its VLAN association table to add the MVLAN ID as if it were another VLAN designation to any ports (internal or external) that are associated with any of the VLAN designations corresponding to that MVLAN ID. The intermediate devices may also maintain subscription information by monitoring subscription and cancellation request exchanges between the MND and the entities. Accordingly, the intermediate devices may also know which ports, internal and external, are to receive a particular multicast message stream.

Thereafter, upon receipt of a multicast message, the intermediate device adjacent to the entity sourcing the message attaches the VLAN designation associated with the port on which the message was received. Thereafter, the switches deliver the multicast message to the MND and all subscriber-ports sharing the same VLAN designation as the sourcing entity. Upon receipt, the MND creates a new message replacing the VLAN designation with the MVLAN ID corresponding to the remaining VLAN designations associated with the group multicast address. The MND then forwards this multicast message to the appropriate intermediate devices, each of which references its VLAN association table to deliver the message to the remaining subscriber-ports.

Specifically, each particular intermediate device identifies the ports that are to receive the multicast message and determines whether those ports are associated with the MVLAN ID attached to the message. As noted, all subscriber-ports (except those sharing the same VLAN designation as the message sender) have been associated with the MVLAN ID as a result of the prior advertisements. A message having an MVLAN ID and group multicast address that correspond to an internal port (e.g., a port coupled to a LAN containing subscribing entities), is forwarded directly to that port by the intermediate device after removing the MVLAN ID. A message having an MVLAN ID and group destination address that correspond to an external port is forwarded to that external port with the MVLAN ID still in place. If the MVLAN ID does not correspond to a port that nonetheless subscribes to the message (e.g., because the port shares the same VLAN designation as the sourcing entity and thus already received the message), the intermediate device does not forward the message to that port.

In an alternate embodiment of the invention, an intermediate device attaches the appropriate MVLAN ID to multicast messages received from local entities. Here, the MND may nonetheless be employed to generate the MVLAN IDs, propagate these identifiers and their associated VLAN designations to the intermediate devices and perform additional routing functions. In addition to attaching the MVLAN ID, each intermediate device may also attach, if necessary, a VLAN designation to the message that corresponds to the VLAN designation of the entity sourcing the message. Accordingly, the multicast message bearing both the MVLAN ID and VLAN designation may be distributed to all subscribing ports by the intermediate devices.

BRIEF DESCRIPTION OF THE DRAWINGS

The above and further advantages of the invention may be better understood by referring to the following description in conjunction with the accompanying drawings, in which:

FIG. 2B is schematic representation of an intermediate device forwarding table;

FIG. 2C is a schematic representation of an intermediate device group forwarding table;

DESCRIPTION OF THE PREFERRED EMBODIMENT

Figure 1A:
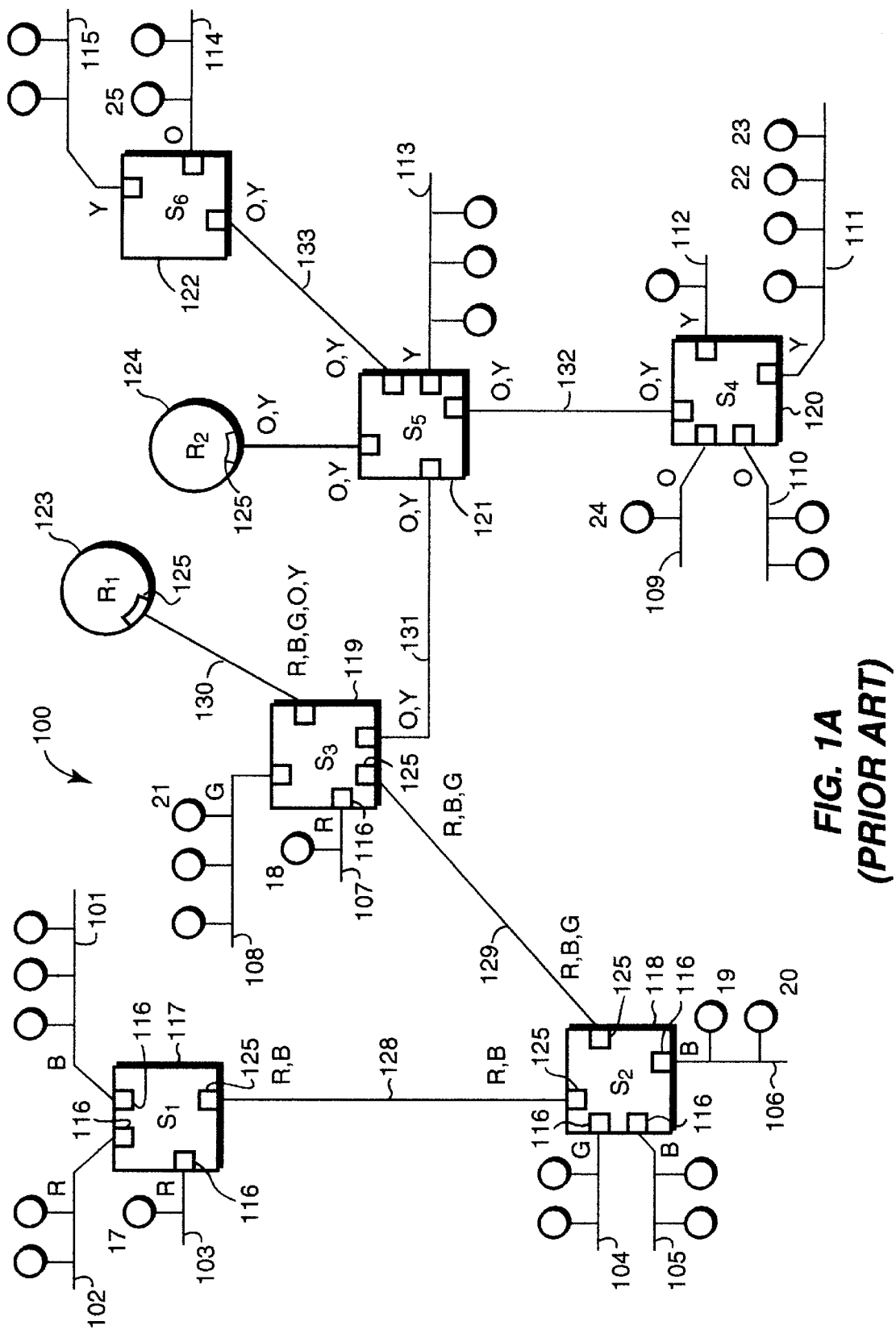
FIG. 1A, previously discussed, is a highly schematic block diagram of a conventional computer network.
Figure 1B:
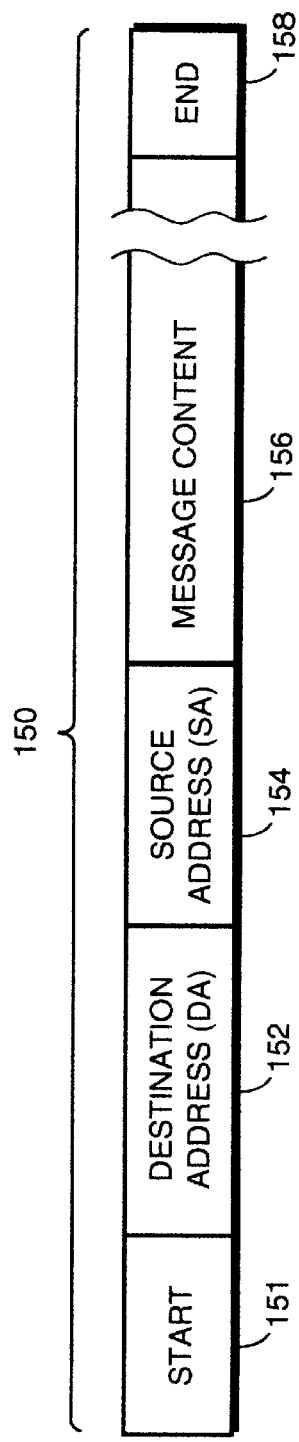
FIG. 1B, previously discussed, illustrates the format of a typical digital data message carried by a LAN.
Figure 1C:
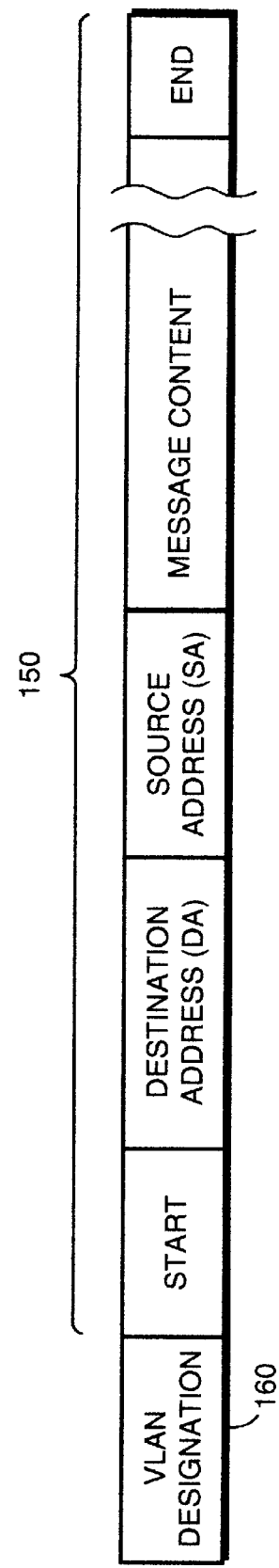
FIG. 1C, previously discussed, illustrates the format of a digital data message with a VLAN designation attached thereto.
Figure 2A:
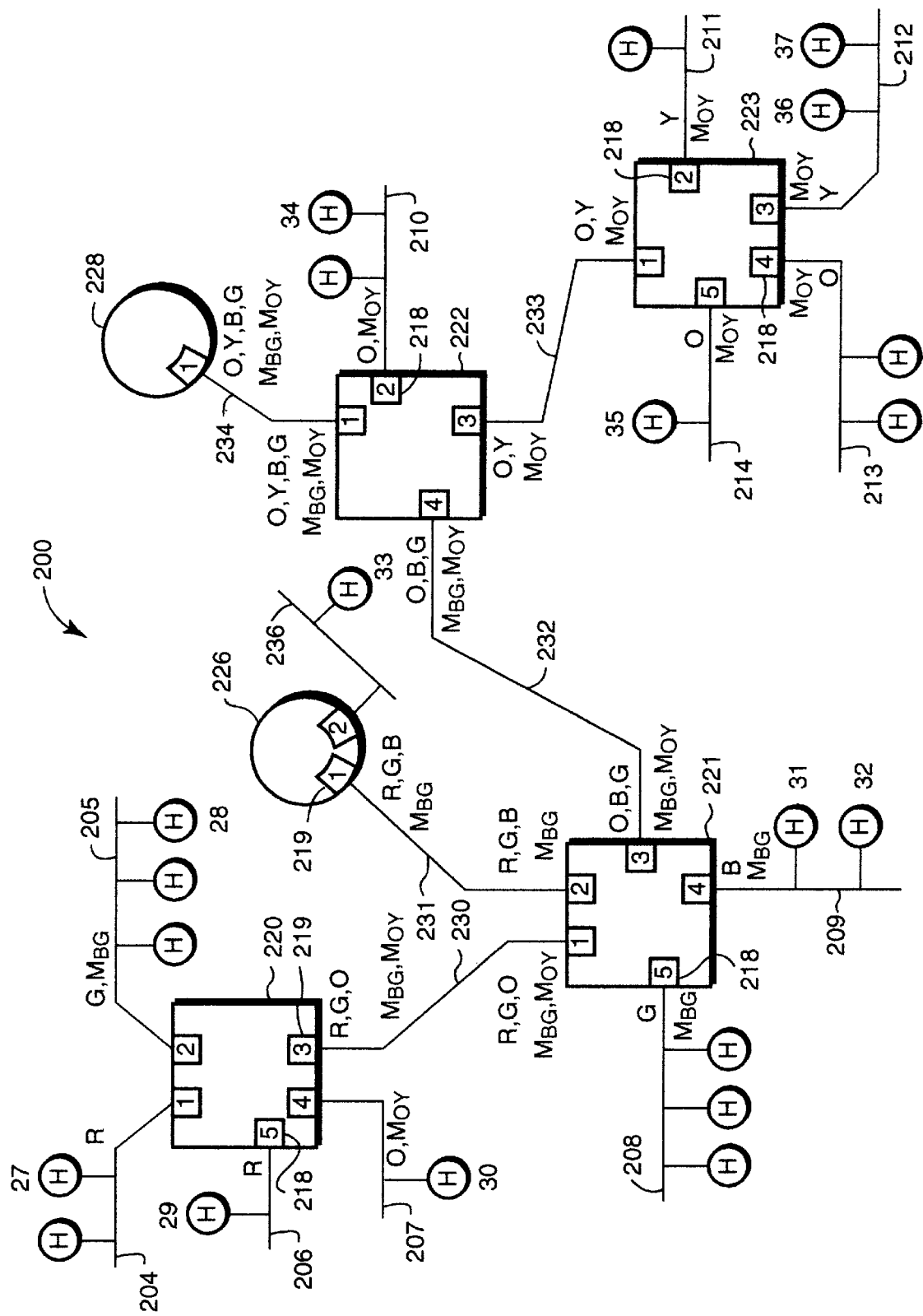
FIG. 2A is a highly schematic block diagram of a computer network in accordance with the present invention.

FIG. 2A is a block diagram of an illustrative computer network 200 that operates in accordance with the present invention. The network 200 includes a plurality of local area networks 204–214. Each local area network (LAN) 203–214 preferably includes one or more entities or hosts (labeled "H") and is preferably connected to an internal port 218 of an intermediate device 220–223, such as a switch or hub. The network 200 may also include one or more multicast network devices (MND) 226, 228, such as a multicast routers.

Intermediate devices 220–223 and MNDs 226, 228 are preferably interconnected via a series of trunk lines. For example, intermediate devices 220 and 221 may be coupled together via trunk line 230 that connects to an external port 219 of each intermediate device 220, 221. Suitable trunk lines include point-to-point links. Similarly, device 221 and MND 226 are coupled via trunk line 231, devices 221 and 222 via trunk line 232, devices 222 and 223 via trunk line 233 and device 222 and MND 228 via trunk line 234. Again, each of these trunk lines 231–234 may be a point-to-point link.

Intermediate devices 220–223 are preferably capable of establishing segmented virtual local area networks (VLANs) by associating various groups of LANs 204–214. More specifically, each port of intermediate devices 220–223 may be designated by a port number (e.g., 1, 2, 3, 4 . . . ) and associated with at least one VLAN designation (e.g., a color); "R" for red, "B" for blue, "G" for green, "Y" for yellow and "O" for orange. Each LAN and entity coupled to a port are thus similarly associated with the corresponding VLAN designation. By associating a given segment of the network 200 (e.g., LANs 204 and 206) with the same VLAN designation (e.g., red), a virtual local area network may be established comprising these LANs. A LAN 236, not associated with any VLAN designation, may be coupled directly to MND 226.

Referring to FIG. 2B, each intermediate device (e.g., device 220) preferably includes a VLAN designation table 240 in an area of memory that associates each port of the device with the VLAN designation(s) corresponding to that port. The VLAN designation(s) associated with an external port 219 preferably include all VLANs reachable through (i.e., "behind") that port. The VLAN designation table 240 may further include the Media Access Control ("MAC") address of each entity reachable through the corresponding port or only the local entities of that device.

Intermediate devices 220–223 and MNDs 226, 228 preferably execute a VLAN configuration protocol, such as the VLAN Trunk Protocol (VTP) from Cisco Systems, Inc. that informs each intermediate device and MND of the current state of VLAN designations in use throughout the network 200. In accordance with this protocol, each device 220–223 and MND 226, 226 transmits predefined advertisements containing information regarding the current VLAN configuration at the sourcing device. An advertisement is essentially a service message having a destination address (e.g., VLAN_INTERMEDIATE_DEVICES) known to stations interested in that particular service. Accordingly, by listening for the desired destination address, stations receive relevant information. By means of such advertisements, any re-configuration of the network 200, including deleting an existing VLAN or changing the parameters of an existing VLAN, may be quickly propagated to all intermediate devices.

Intermediate devices 220–223 also support the exchange of messages between entities on LANs associated with the same VLAN designation (i.e., within a given VLAN segment). Suitable intermediate devices are described in U.S. Pat. No. 5,394,402 to Floyd E. Ross and in commonly owned U.S. Pat. No. 5,742,604 issued Apr. 21, 1998 which are both hereby incorporated by reference in their entirety. MNDs 226, 228 support the transmission of multicast messages by the entities. That is, MNDs 226, 228 allow entities to transmit messages for receipt by entities of diverse VLAN designations.

IGMP and the Creation of Groups

To receive multicast messages, entities (e.g., entities 28–37) preferably subscribe to such messages by registering with MNDs 226, 228. Entities may utilize the well-known Internet Group Management Protocol (IGMP) to subscribe to any given multicast message stream. In accordance with IGMP, an entity wishing to receive a certain multicast message transmits a JoinGroup operation which includes the group destination address of the desired multicast message as its arguments or relies on such a transmission by its neighbor. Similarly, to cancel membership in a given group, an entity may transmit a LeaveGroup operation which also has the corresponding group destination address as its arguments. As discussed below, each MND 226, 228, in response to these requests, preferably updates a table stored in a portion of memory associating the VLAN designations of the subscribing entities (e.g., red, blue, green, orange and yellow) with a corresponding group destination address (e.g., NEWSFROM27).

It should be understood that entities may use other similar protocols such as Generalized Attribute Registration Protocol (GARP) formerly Group Address Registration Protocol from 3Com Corp. or the Cisco Group Management Protocol (CGMP) from Cisco Systems, Inc.

Each MND 226, 228, moreover, is preferably configured to distribute multicast messages across a given subset of VLAN designations. MND 226, for example, may be configured to distribute multicast messages across the red, blue and green VLAN designations, whereas, MND 228 may be configured to distribute multicast messages across the yellow and orange VLAN designations. A multicasting routing protocol, such as Distance Vector Multicast Routing Protocol (DVMRP), Protocol Independent Multicast-Sparse Mode (PIM-SM) or Protocol Independent Multicast-Dense Mode (PIM-DM), may be implemented to assign these multicast distribution responsibilities among the MNDs. These protocols are also well-known to those skilled in the art. By associating each MND 226, 228 with its corresponding VLAN designations, the MND may receive messages with those designations. Thus, MND 226 may be connected to the red, blue and green VLAN designations and MND 228 may be connected to the orange and yellow VLAN designations.

Figure 3:
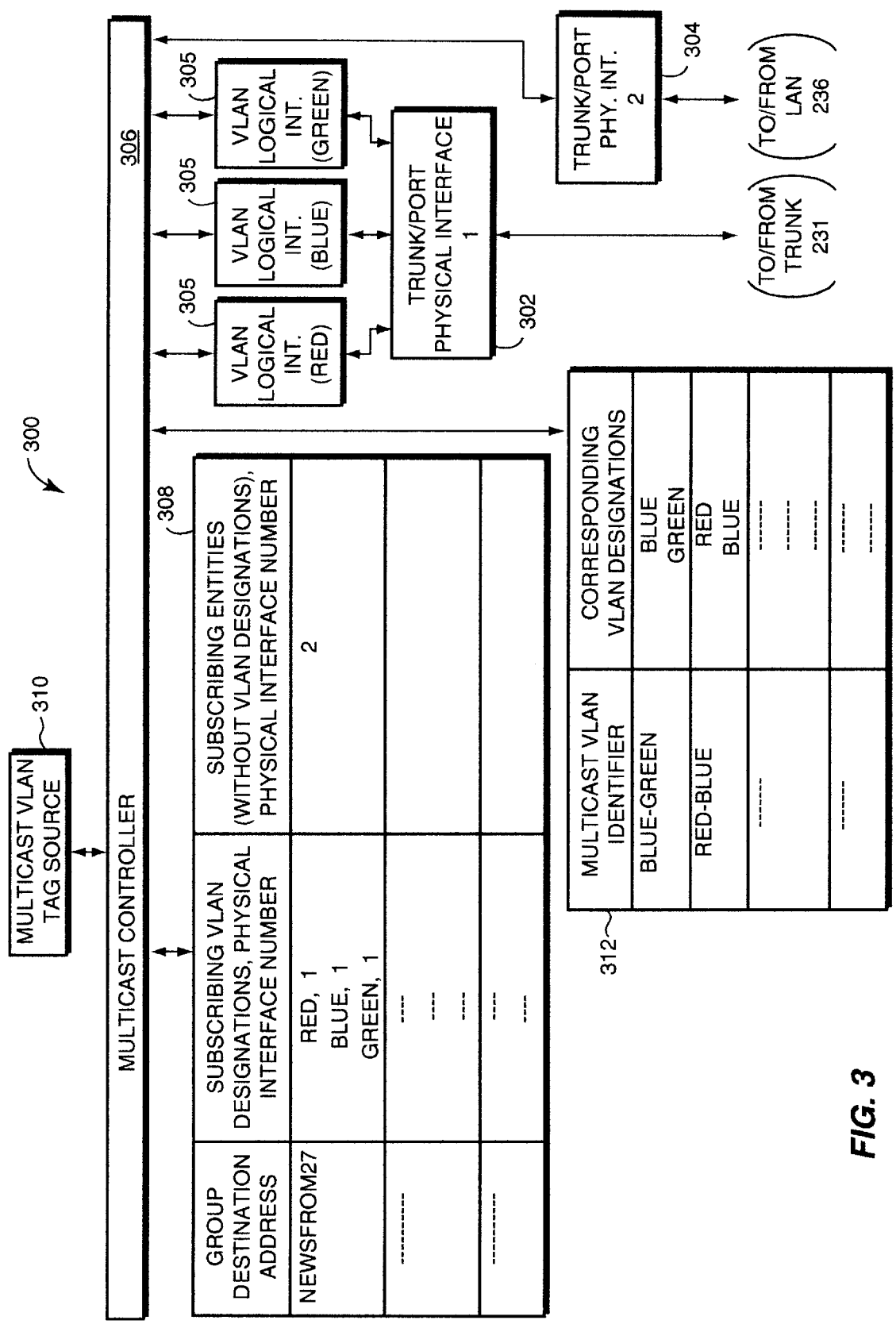
FIG. 3 is a schematic block diagram of a multicast control engine that facilitates the efficient distribution of multicast messages over the network of FIG. 2A.

Referring to FIG. 3, each MND 226, 228 preferably includes a multicast control engine 300. The control engine 300 may include a trunk/port physical interface circuit 302, 304 for each trunk 231 or LAN 236 (FIG. 2A) that is coupled to the MND (e.g., MND 226). The control engine 300 may further include a plurality of logical interfaces 305 each configured to receive messages having a particular VLAN designation (e.g., red, blue, green, etc.). Each logical interface 305, moreover, is coupled to the trunk/port physical interface 302 through which the corresponding VLAN messages are received.

IGMP messages (among others) addressed to MND 226 are received at the trunk interface circuits 302, 304 and passed via the corresponding logical interface 305 to circuitry and programming defining a multicast controller 306. The multicast controller 306 may include a processor and a memory containing software programs pertaining to the methods described herein and executable by the processor. Other computer readable media may also be used by the multicast controller 306 to store and execute the program instructions.

In response to the IGMP messages, the multicast controller 306 corresponding to each MND 226, 228 preferably stores group multicast addresses and VLAN designations in a subscription table 308. That is, for the IP group destination address NEWSFROM27, the multicast controller 306 associated with MND 226 registers the red, blue and green VLAN designations (corresponding to subscribing entities 28, 29, 31 and 32) within table 308. As entities of various VLAN designations join and leave this group, subscription table 308 is correspondingly updated and modified as necessary. Table 308 may also reflect that LAN 236, which is accessible via physical interface number two and not associated with any VLAN designation, also subscribes to these messages.

A multicast controller (not shown) associated with MND 228 similarly registers the yellow and orange VLAN designations (corresponding to subscribing entities 30 and 34–37) with the NEWSFROM27 group address within its subscription table. Accordingly, subscription tables 308, which may be content addressable memories (CAM), contain a current list of all group destination addresses and the VLAN designations (or addresses) of the subscribing entities corresponding thereto.

A system administrator or the MNDs 226, 228 may instruct entity 27 (or any other entity) to utilize this group destination address (e.g., NEWSFROM27) when transmitting its multicast messages. Entity 27 need not subscribe to its own multicast messages and, in most circumstances, will not know which entities subscribe to its multicast messages. Instead, this information is maintained by MNDs 226, 228 and/or the devices 220–223, as described below.

Intermediate devices 220–223 preferably monitor and record the IGMP messaging taking place between the entities and the MNDs 226, 228. More specifically, as shown in FIG. 2C, each intermediate device (e.g., device 220) preferably maintains a group forwarding table 250 in addition to the VLAN designation table 240 (FIG. 2B). The group forwarding the table 250 preferably associates each group multicast address with the VLAN designations of the subscribing entities and the port numbers used to reach those entities. Accordingly, intermediate devices 220–223 may "know" on which ports to forward a message directed to a given group destination address.

In particular, device 220 knows that entities associated with the red, blue, green and orange VLAN designations subscribe to multicast messages having NEWSFROM27 as their group destination address and that these entities are reachable via port numbers two through five. Since neither device 220 or 221 is coupled to any entities associated with the yellow VLAN designation, messages carrying a "yellow" VLAN designation are typically not forwarded to these devices. Thus, neither device may be aware that entities associated with the yellow VLAN designation subscribe to these group destination messages. Nonetheless, it should be understood that all intermediate devices 220–223 are instructed (e.g., pursuant to the IGMP protocol) to forward all multicast messages to the corresponding MND 226, 228.

In accordance with the present invention, multicast controller 306 reviews the information stored in VLAN subscription table 308 corresponding to a given group multicast address each time a registration or cancellation message is received to determine whether any Multicast VLAN (MVLAN) identifiers (ID) should be generated. For example, according to the information contained within group association table 308 corresponding to MND 226, the VLANs associated with group address NEWSFROM27 include the red, blue and green VLAN designations. Under the prior art system, in order to forward a NEWSFROM27 group multicast message from entity 27, a router would have to make at least two copies of the message; one with the blue VLAN designation and the other with the green VLAN designation. By virtue of the present invention, only one copy of the message need be created in order to forward such a multicast message.

More specifically, having determined that the subscribers to NEWSFROM27 include the red, blue and green VLAN designations and that messages with this group address may originate on the "red" VLAN, multicast controller 306 preferably generates an MVLAN ID that combines both the blue and green VLAN designations. Specifically, multicast controller 306 preferably obtains an MVLAN ID (e.g., blue-green or $M_{BG}$) from a multicast VLAN tag source 310 accessible to controller 306.

It should be understood that in order to avoid possible forwarding errors by devices 220–223, the selected MVLAN ID, blue-green, must be distinguishable from all current VLAN designations and any previously established MVLAN IDs. In addition, to allow other entities to also transmit messages to the NEWSFROM27 group multicast address, controller 306 may establish additional MVLAN IDs, such as red-blue (for messages sourced by entities on the green VLAN), red-green (for entities on the blue VLAN) and red-blue-green (for messages sourced on the non-VLAN LAN 236). That is, controller 306 may establish an MVLAN ID for each unique combination of VLANs to which a group multicast address may be directed.

The multicast VLAN tag source 310 may comprise a block of available MVLAN IDs provided by a system administrator. The system administrator preferably ensures that no overlap exists between the blocks of available identifiers provided to each MND. Alternatively, the MNDs may execute a protocol which allows them to obtain and release MVLAN IDs dynamically.

The new MVLAN ID, blue-green, is preferably entered into a multicast VLAN table 312 by the multicast controller 306. The multicast VLAN table 312, which may be another CAM, contains a list of all MVLAN IDs obtained by the controller 306 and the VLAN designations that correspond thereto. Thus, by performing a look up on table 312, controller 306 can identify the MVLAN ID corresponding to a given list of VLAN designations. In this example, the multicast controller 306 directs the multicast VLAN table 312 to record and store the blue and green VLAN designations associated with the new MVLAN ID, blue-green. MND 228, which is configured to distribute messages along the orange and yellow VLAN segments, similarly generates a second MVLAN ID (e.g., orange-yellow or $M_{OY}$) associated al with the corresponding orange and yellow VLAN designations.

Referring back to FIG. 2A, MNDs 226, 228 next proceed to inform the intermediate devices 220–223 of the new MVLAN IDs. In particular, MND 226 propagates the association of the blue and green VLANs with the new MVLAN ID, blue-green, by issuing advertisements. More specifically, MND 226 formulate s an advertisement message for each of the VLAN designations comprising th e new MVLAN ID. For example, an advertisement message having a blue VLAN designation and associating the blue VLAN with the blue-green MVLAN ID is transmitted across the network 200. In addition, an advertisement having a green VLAN designation and associating the green VLAN with the blue-green MVLAN ID is transmitted. Although preferably received by each intermediate device having either a blue or green designated internal port and by the MNDs, not all intermediate devices may receive the advertisements, as discussed below.

It should be understood that, rather than transmitting a separate MVLAN ID advertisement message for each VLAN corresponding thereto, the MND preferably issues advertisements that contain all of the MVLAN IDs associated with each VLAN designation. That is, if the blue VLAN is associated with the blue-green and red-blue MVLAN IDs, a single MVLAN ID advertisement message having the blue VLAN designation attached thereto and including both MVLAN IDs will be transmitted.

In response to the MVLAN ID advertisements, each intermediate device 220–223 modifies its VLAN designation table 240 (FIG. 2B). That is, each intermediate device 220–223 adds the MVLAN ID, blue-green, which the devices simply consider to be another VLAN designation, to all ports associated with the blue or green VLANs. Device 221, for example, associates its internal port number four coupled to LAN 209 with the blue-green MVLAN ID as well as the "blue" VLAN designation. Since a LAN associated with the green VLAN designation exists remote from intermediate device 221, it additionally associates its external port number one corresponding to trunk 230 with the blue-green MVLAN ID. Similarly, device 220 associates its internal port number two coupled to the "green" LAN 205 with both the green VLAN designation and the blue-green MVLAN ID. Devices 220, 222 and 223, similarly associates their "yellow" and "orange" ports with the orange-yellow MVLAN ID, based on advertisements from MND 228.

Figure 4:
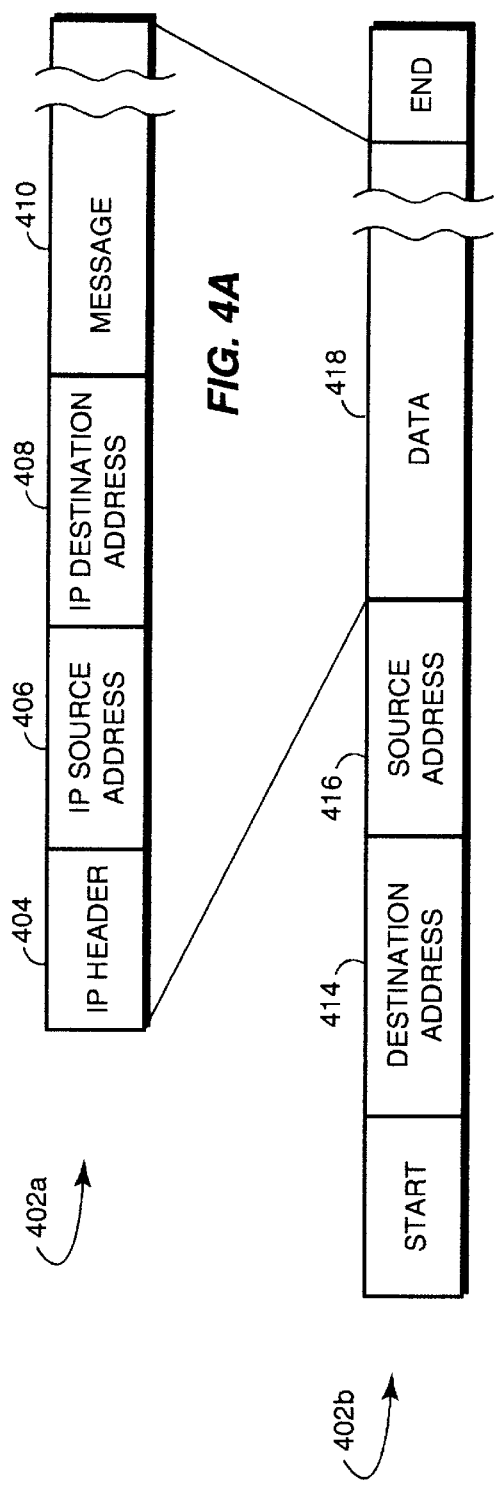
FIG. 4A illustrates the format of a network layer digital data message.
FIG. 4B illustrates the format of a data frame.
FIG. 4C illustrates the format of a data frame with a VLAN designation attached thereto.
FIG. 4D illustrates the format of a data frame with a Multicast VLAN identifier attached thereto.

The efficient distribution of a multicast message across network 200 proceeds as follows. Assume that entity 27 on LAN 204 wishes to send a multicast message having NEWSFROM27 as its group destination address. To transmit such messages, entity 27 preferably utilizes the TCP/IP protocol model which readily supports multicast messaging at the network protocol layer. As shown in FIG. 4A, entity 27 (FIG. 2A) formulates a packet 402a that includes an IP header 404, a source IP address field 406 which contains the IP address of entity 27, a destination IP address field 408 which contains the IP group destination address NEWSFROM27 and a message 410.

It should be understood that other network layer protocols, such as AppleTalk or Internet Packet Exchange (IPX), may be utilized.

Referring to FIG. 4B, the packet 402a may then be converted into a frame 402b or plurality of frames suitable for transmission at the data link level on LAN 204. Each frame 402b preferably includes a destination address field 414 that contains a MAC address derived from the IP destination address in field 408 of packet 402a and a source address field 416 containing the MAC address of entity 27. A data portion 418 of the frame 402b corresponds to the entire packet 402a of FIG. 4A.

Once transmitted on LAN 204, each multicast frame 402b is received at port number one of device 220 which is associated with the red VLAN designation. Accordingly, device 220 attaches a VLAN designation field 420 to the multicast frame 402b and enters the "red" designation, creating a VLAN frame 402c, as shown in FIG. 4C. Other than the VLAN designation 420, frame 402c is essentially the same as frame 402b. Based on the destination address in field 414 and the information in table 250 (FIG. 2C), device 220 determines that frame 402c is intended for port numbers two through five. Since the "red" VLAN designation of the frame 402c, moreover, matches the VLAN designations of port numbers three and five, device 220 drives a copy of frame 402c onto these ports for transmission across LAN 206 (after stripping off the VLAN designation field 420) and trunk 230 for device 221 (with the VLAN designation field 420 attached). Since the "red" VLAN designation of frame 402c does not match the green and blue-green or orange and orange-yellow designations associated with port numbers two and four, respectively, device 220 is precluded from forwarding frame 402c to these ports.

It should be understood that if intermediate devices 220–223 do not participate in the IGMP messaging, they will not know which ports are coupled to the subscribers of a particular multicast stream. In this case, devices 220–225 may simply forward the multicast frame 402c to all ports 218, 219 which match the VLAN designation of the multicast message (e.g., red).

Upon receipt, intermediate device 221 determines that message 402c carries a "red" VLAN designation and is intended for port numbers one and two through four, which are coupled to trunks 230, 231 and 232 and LAN 209, respectively. Nonetheless, intermediate device 221 is prevented from forwarding the message onto port numbers three and four due to the dissimilarity in VLAN designations between the message (i.e., red) and the corresponding ports (i.e., orange, blue and blue-green for port number three and blue and blue-green for port number four). In addition, the message was received on trunk 230. Accordingly, device 221 simply drives the message onto port number two coupled to trunk 231, which is associated with the red VLAN designation.

Multicast message 402c is next received at MND 226. Referring again to FIG. 3, the message 402c is received at trunk/port interface 302 which corresponds to trunk 231 and delivered to multicast controller 306 via the "red" VLAN configured logical interface 305. Controller 306 deletes the "MAC header" from message 402c (i.e., VLAN field 420, start field, MAC destination address field 414, MAC source address field 416 and end field) to obtain the original IP packet 402a created by entity 27. Controller 306 next looks up group association table 308 to determine which VLAN designations and non-VLAN associated LANs, if any, correspond to multicast messages having the IP group multicast address NEWSFROM27. Controller 306 determines that the corresponding VLAN designations and LANs are the red, blue and green VLANs, which are all coupled to physical interface one, and LAN 236, which is coupled to physical interface two. Since the message was received on the "red" VLAN logical interface 305 and thus should have already been delivered to this segment of the network 200 (FIG. 2A), multicast controller 306 preferably ignores the "red" VLAN.

Next, multicast controller 306 of MND 226, which is configured to distribute messages along the red, blue and green VLAN segments, generates a list of VLAN designations on which the message is to be transmitted (in this case, blue and green), based on information in table 308. A look up is performed on table 312 to identify the MVLAN ID encompassing the blue and green VLAN designations (i.e., blue-green). Having located the MVLAN ID, multicast controller 306 prepares to transmit the message to the remaining subscribers. In particular, controller 306 generates one copy of the packet 402a similar to the packet generated by entity 27. The controller 306 may perform conventional routing functions to the IP header field 404, such as decrementing a time-to-live (TTL) value (not shown).

The packet 402a, carrying the message 410 generated by entity 27, is then converted into one or more frames 402b, as shown in FIG. 4B, for transmission by MND 226. Each frame 402b, moreover, has a source address field 416 containing the MAC address of physical port one of MND 226 and a destination address field 414 containing a MAC address derived from the IP address utilized in field 408 of packet 402a, which may be the same group MAC address utilized by entity 27. As shown in FIG. 4D, multicast controller 306 attaches a Multicast VLAN field 422 to each frame 402b, creating a multicast frame 402d. The blue-green MVLAN ID is entered into field 422 by controller 306, which then drives frame 402d onto trunk/port physical interface one 302 for transmission on trunk 231 (FIG. 2A).

It should be understood that if the message had been sourced by an entity on the green VLAN and thus received by MND 226 on its green VLAN logical interface 305, controller 306 would select the red-blue MVLAN ID for use in distributing the message.

A second copy of each frame 402b, without the Multicast VLAN field 422 or the VLAN tag field 420 is also created by controller 306 for transmission to LAN 236. The source address field 416 of these frames contains the MAC address of physical port two of MND 226, which is coupled to LAN 236. These "un-tagged" frames 402b are then driven onto physical port two by controller 306 and received by LAN 236 and subscribing entity 34.

Returning to FIG. 2A, multicast frame 402d, carrying the blue-green MVLAN ID, is first received at intermediate device 221. Device 221 consults its group table 250 (FIG. 2C) and determines that its port numbers one through four, which are coupled trunks 230, 231 (on which the message was received) and 232 and LAN 209, respectively, are to receive the message. Since a match exists between the VLAN designations (i.e., blue and blue-green) of port number four and the MVLAN ID of the message 402d (i.e., blue-green), device 221 strips off the Multicast VLAN field 422, creating a message in the form of frame 402b, and drives this message onto port number four for receipt by subscribing entities 31 and 32. Although port number five is also associated with the blue-green MVLAN ID due to the distribution of MVLAN advertisements by MND 226, device 221 does not drive a copy of the message onto this port, because it is not listed in its group table as being coupled to any subscribers. With regard to the external ports (numbers one and three), which are also associated with the blue-green MVLAN ID, among other designations, device 221 drives a copy of the message in the form of frame 402d (i.e., with the blue-green MVLAN ID attached) onto these ports.

Upon receipt, device 220 similarly consults its group table 250 (FIG. 2C) and VLAN designation table 240 (FIG. 2B) and determines that port numbers two, three, four and five coupled to LAN 205, trunk 230 and LANs 207 and 206, respectively, are to receive the message. Device 220 further determines that a match exists between the "blue-green" designation of the message and green and blue-green designations associated with port number two. Accordingly, device 220 removes the Multicast VLAN field 422 from message 402d and drives this "un-tagged" message onto port number two for receipt by subscribing entity 28. As the "blue-green" designation of the message does not match the "orange" and "yellow-orange" designations associated with port number four or the "red" designation associated with port number five, device 220 is precluded from driving copies of the message onto these ports. Recall, however, that the message has already been delivered to entity 29 coupled to port number five.

In order for MND 228 to distribute NEWSFROM27 multicasts along the yellow and orange VLAN segments of network 200, it must first receive such messages from MND 226. Accordingly, MND 228 is preferably associated with one or both of the blue and green VLAN designations so that it may receive messages carrying such designations. The selection of VLAN designations shared between the MNDs is preferably accomplished in a conventional manner by configuring the MNDs. As a result, advertisements from MND 226 associating the blue-green MVLAN ID with the blue and green VLAN designations are delivered to MND 228. Distribution of the MVLAN ID advertisements further results in devices 221 and 222 associating their port numbers three and one, respectively, with the blue-green MVLAN ID. Thus, upon receipt of the "blue-green" multicast frame 402d at device 221 from MND 226, device 221 also drives the frame onto its port number three for delivery to MND 228 via device 222.

Upon receipt at MND 228, the corresponding multicast controller considers itself to have received two copies of the message; one on its blue VLAN logical interface and the second on its green VLAN logical interface. Convergence of the DVMRP or PIM protocols causes MND 228 to select at most one "copy" of the message (e.g., the blue message) to forward. The second "copy" (e.g., the green message) is discarded. The selected "copy" is then modified to obtain the underlying IP packet 402a.

As described above, the multicast controller at MND 228 next examines the IP destination and source addresses of the packet 402a and, based on the information contained in its corresponding group association table, determines that it is to distribute the message on the yellow and orange VLAN segments of network 200. Next, a look-up function is performed on the MVLAN ID table to identify the MVLAN ID (i.e., orange-yellow) corresponding to the orange and yellow VLAN designations. The controller may perform conventional routing functions to the IP header field 404, such as decrementing a TTL value.

After locating the correct MVLAN ID (orange-yellow), the controller generates one or more frames in the form of frame 402b. Each frame 402b, moreover, preferably includes a MAC destination address derived from the IP NEWSFROM27 group address in field 414 and a MAC source address corresponding to port number one of MND 228 in field 416. The controller next attaches a Multicast VLAN field 422 to each frame, creating a message in the form of frame 402d (FIG. 4D). The orange-yellow MVLAN ID, which was identified by the controller, is entered into the Multicast VLAN field 422.

Multicast controller at MND 228 next moves the message carrying the orange-yellow MVLAN, ID onto its single trunk/port physical interface for transmission on trunk 234. The message is received at device 222 and driven onto port numbers two (without the Multicast VLAN field 422), three (with the MVLAN ID) and four (with the MVLAN ID) which have each been associated with the orange-yellow MVLAN ID as a result of MVLAN advertisements issued by MND 228. At device 223, the message with the MVLAN ID field removed is similarly driven onto port numbers three and five coupled to LANs 212 and 214 for receipt by subscribing entities 35–37.

Returning to device 222, the message is also driven onto port number four for receipt by device 221. Since LAN 207 at device 220 is associated with the orange VLAN designation and orange-yellow MVLAN ID, port number one at device 221 carries the orange VLAN designation and the orange-yellow MVLAN ID. Accordingly, device 221 drives the message with the orange-yellow MVLAN ID onto its port number one for receipt by device 220. Upon receipt, device 220 examines the message and determines that it is intended for port numbers one through five, but that the message was received on port number three and a color match only exists with port number four. In response, device 220 removes the Multicast VLAN field 422 from the message and drives the "un-tagged" message onto port number four for receipt by subscribing entity 30.

As shown, in accordance with the present invention, each MND 226, 228 is able to distribute multicast messages to subscribing entities of diverse VLAN associations without having to make a separate copy for each subscribing VLAN. Thus, the bandwidth normally consumed on trunks 231 to MND 226 and trunk 234 to MND 228 via the prior art system is substantially reduced.

It should be understood that a single MND may be utilized to distribute multicast messages.

It should be further understood that cancellation requests may not result in the generation of a new MVLAN ID. For example, if all of the entities associated with the blue VLAN (e.g., entities 31 and 32) decide to cancel their subscription to multicast messages addressed to NEWSFROM27, MND 228 need not create a new MVLAN ID. Instead, when such a multicast message is received at MND 228, it may essentially replace the "red" VLAN designation with the blue-green MVLAN ID and forward the message to intermediate device 222, as previously discussed. By participating in the IGMP messaging, intermediate devices 220–222 will learn that the ports corresponding to entities 31 and 32 have canceled their subscription to this multicast message. Accordingly, when the message reaches device 221, it will not forward the message to its port number four corresponding to LAN 209 even though that port has been associated with the blue-green MVLAN ID, because table 250 will no longer list this port number as subscribing to this particular multicast message. Thus, by participating in the IGMP messaging, intermediate devices are able to filter multicast messages. This may significantly reduce the number of MVLAN IDs that need to be created for any given network and also reduces the exchange of advertisement associating MVLAN IDs with VLAN designations.

Since it takes some amount of time for MVLAN advertisements to propagate through the entire network 200 and for the devices 220–223 to update their tables 240 and 250 (FIGS. 2B and 2C), certain rules should be implemented to prevent multicast messages from being misdelivered or undelivered. First, rather than change the VLAN designations that are associated with a given MVLAN ID following a subscription change (e.g., cancellation or addition), the MND preferably creates a new MVLAN ID for the VLANs associated with the subscribing entities. Second, an MND preferably waits until at least three MVLAN advertisements have been sent and one second has elapsed since the last advertisement was transmitted before utilizing the new MVLAN ID to distribute a multicast message. This assures that the new MVLAN ID has been propagated throughout the network 200. Third, to prevent possible data corruption, intermediate devices should not retain MVLAN IDs across power outages or reboots. Fourth, if orderly delivery of multicast messages is desired, the MND may need to delay transmission bf a stream of multicast messages issued to more than one MVLAN ID (e.g., blue-green and orange-yellow). Each MND, moreover should utilize the same MAC source address for all frames transmitted on a given physical interface regardless of the VLAN designation of the frames to avoid any confusion as to the location of the MND.

Distribution Around Blocked Ports

It should also be understood that in most computer networks, LANs will interconnect to more than one intermediate device. By coupling each LAN to multiple devices, network redundancy and fault-tolerance is provided. For example, if one device fails, communication with LANs connected to the failed device will often be possible through other devices. The connection of a LAN to more than one device, however, creates the possibility of endless forwarding loops. To prevent such loops, devices preferably implement spanning tree algorithms, which are well-known in the art, to block redundant communication paths within the network.

In the network 200 of FIG. 2A, each VLAN segment preferably corresponds to a single spanning tree. That is, the spanning tree algorithm is configured to generate a single, loop-free path that connects every LAN associated with each VLAN designation (e.g., red), which may differ from the spanning tree defined for a second VLAN designation (e.g., blue). Preferably, the spanning tree algorithm is also configured to generate a single, loop-free path for each MVLAN ID (e.g., blue-green). By allowing messages to be crossed from one VLAN segment to another (e.g., from red to blue, green, yellow and orange) through the use of MVLAN IDs, as described above, a potential for looping exists. One solution to this problem is to transmit the MVLAN advertisements with VLAN designations and to limit the transmission of MVLAN advertisements only to trunks. That is, intermediate devices are preferably precluded from transmitting MVLAN advertisements onto a non-trunk LAN whether or not that LAN represents the only communications path to an adjacent device.

Since MVLAN advertisements are preferably not transmitted across LANs, the execution of spanning tree algorithms may prevent such advertisements from reaching all interested devices. That is, where two devices are interconnected by the same "red" LAN, the spanning tree algorithm may block frames carrying a the "red" VLAN designation from traversing a trunk also interconnecting the two devices. Thus, if a MVLAN advertisement having a red VLAN designation is sent, instructing the devices to associate all "red" LANs with a new MVLAN ID (e.g., red-blue), this message would not be delivered to such a device. Accordingly, the device would not update its VLAN designation table or associate its red ports with the new red-blue MVLAN ID. Nonetheless, since the two devices are interconnected via the "red" LAN, multicast messages will be delivered to this device across the LAN, even though the MVLAN advertisement did not reach this device.

Figure 5:
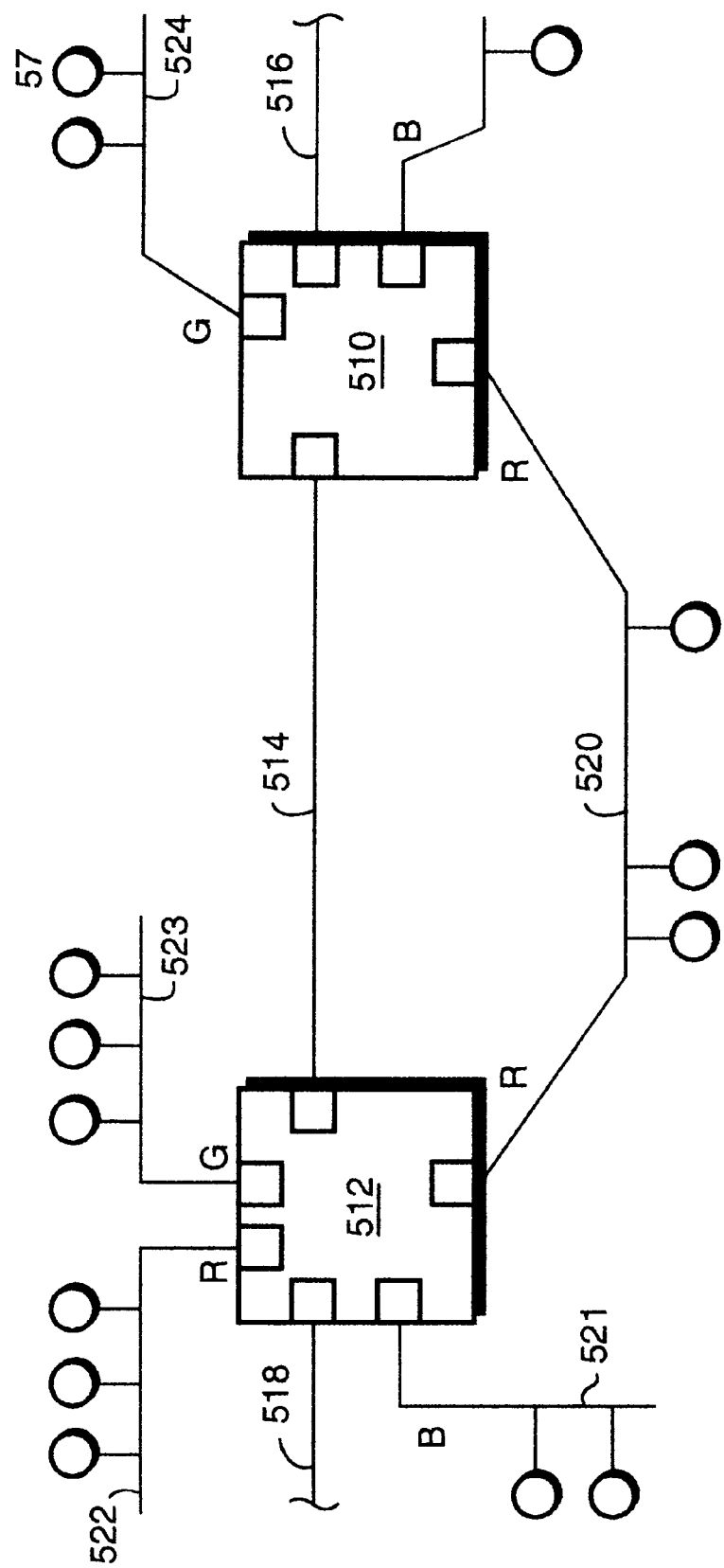
FIG. 5 is a highly schematic block diagram of a segment of a computer network.

FIG. 5 illustrates a segment of a computer network including two intermediate devices 510 and 512 interconnected by a trunk 514. Other portions of the network (e.g., intermediate devices) connect to device 510 via trunk 516 and to device 512 via trunk 518. In addition, devices 510 and 512 are interconnected via LAN 520 which is associated with the red VLAN designation. As a result of the spanning tree algorithm executing in the "red" VLAN, trunk 514 may be blocked from carrying any messages with a red VLAN designation.

Assume that an MVLAN advertisement is received at device 510 from trunk 516 and that the advertisement has a red VLAN designation and instructs the devices to associate all "red" LANs with the blue-red MVLAN ID. Since trunk 514 is blocked from transmitting messages with a red VLAN designation and MVLAN advertisements are not sent on LANs, device 512 does not receive the advertisement and thus does not associate "red" LAN 520 with the blue-red MVLAN ID. An MVLAN advertisement having blue VLAN designation and associating the blue VLAN with the blue-red MVLAN ID may be transmitted over trunk 514, which is only blocked from transmitting messages with red VLAN designations, and received at device 512.

Assume further that at least one entity on each LAN 520–523 coupled to device 512 subscribes to a given multicast message sourced by an entity 57 on LAN 524 coupled to device 510 and associated with the green VLAN designation. When entity 57 transmits a multicast message, that message is received at device 512 at a "green" port, as previously discussed. The message is also received at an MND (not shown) which essentially replaces the green VLAN designation with a blue-red MVLAN ID, as described above, for distribution to the remaining subscribers. When this message, having a blue-red MVLAN ID, is received at device 510, the message is transmitted onto trunk 514 to device 512 and a copy, with the MVLAN ID removed, is forwarded by device 510 onto LAN 520. The message with the blue-red MVLAN ID is received at device 512 from trunk 514. However, only "blue" LAN 521 is associated with the blue-red MVLAN ID. Thus, the message is only forwarded to LAN 521 and not to LAN 522 which is only associated with the red VLAN designation.

Nevertheless, the multicast message without the MVLAN ID (or a VLAN designation for that matter) is received at device 512 via LAN 520. Device 512 examines the message and determines that it is a multicast message arriving on a port associated with the red VLAN. Device 512 further determines that entities located on red LAN 522 subscribe to the message and, based on information in the destination address field, that the message was sourced by the MND and not an entity located on LAN 520. In response, device 512 forwards the message onto LAN 522 since a match exists between these VLAN designations (e.g., red). Thus, even though device 512 never received the MVLAN advertisement directing it to associate "red" LAN 522 with the blue-red MVLAN ID, the message was still delivered to LAN 522.

In another embodiment of the invention, the intermediate devices may be capable of attaching the appropriate MVLAN ID to multicast messages received from a local entity so that those messages may be efficiently delivered to each subscribing entity. More specifically, each device preferably includes a multicast control engine, similar to multicast control engine 300 (FIG. 3). In this embodiment, an MND may be used to generate and propagate MVLAN IDs so that the multicast control engine disposed in the intermediate devices need not include a multicast VLAN tag source, such as tag source 310 (FIG. 3).

In this embodiment, when a multicast message is received at an intermediate device, two copies of the message are propagated on the network. First, the device determines the appropriate MVLAN ID to utilize. The device then attaches this MVLAN ID to one copy of the message and may perform conventional routing functions on the message. A second copy carries the VLAN designation corresponding to the port on which the message was received. To avoid generating multiple message copies, a single device is preferably responsible for the distribution of multicasts corresponding to a given source entity/group multicast address. This device, moreover, should be directly coupled to the MND so that the MND may manage message distribution by the device through the exchange of acknowledgment (ACK/NACK) messages with the device.

Figure 6:
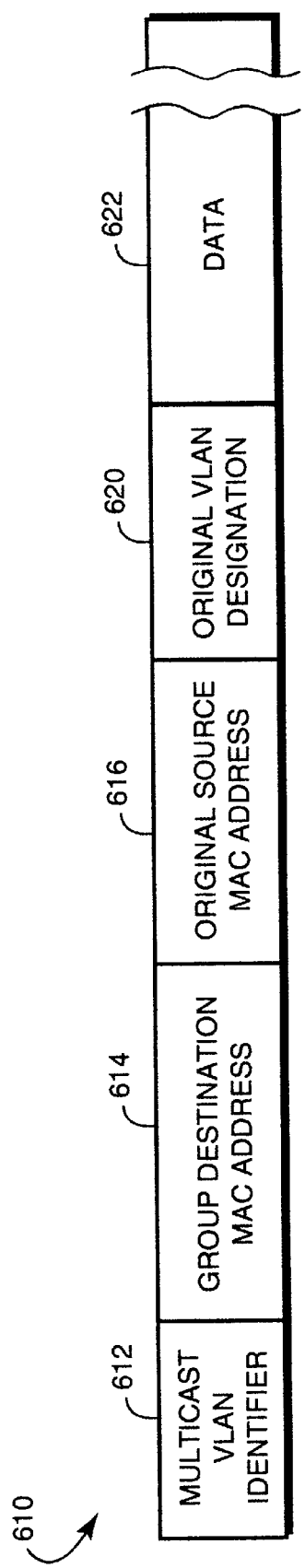
FIG. 6 illustrates the format of a data frame in accordance with another embodiment of the present invention.

In another embodiment, the device may attach the MVLAN ID and the VLAN designation tag to a single copy of the message. Referring to FIG. 6, a frame 610 preferably includes a MVLAN ID field 612 for carrying the MVLAN ID corresponding to the VLAN designation of each subscribing entity, except those subscribing entities, if any, that share the same VLAN designation as the sourcing entity. The frame 610 further includes a group destination MAC address field 614 (e.g., NEWSFROM27) and a source MAC address field 616 containing the address of the sourcing entity. Frame 610 also includes an original VLAN designation field 620 which includes the VLAN designation (e.g., red) associated with the sourcing entity. The frame 610 further includes a data field 622 containing the message itself.

It should be understood that a network may include a combination of multicast-enabled devices and non-enabled devices. If a multicast message is received at a non-enabled device, it must be forwarded either to an MND or a multicast-enabled device in order for the appropriate MVLAN ID to be attached to the message. If a multicast message is received at a multicast-enabled device, that switch may attach the MVLAN ID (and the original VLAN designation) as described above prior to distributing the message across such a hybrid network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A multicast network device (MND) for use in efficiently distributing multicast messages across a computer network having a plurality of entities including at least one sourcing entity for transmitting a multicast message with a given group destination address and one or more subscribing entities for receiving the message, the network capable of associating the entities with one or more virtual local area network (VLAN) designations, the MND comprising:

a memory containing information regarding the VLAN designations associated with the entities subscribing to multicast messages with the given group destination address;

means for generating one or more Multicast VLAN (MVLAN) identifiers (IDs) in response to the information contained in the memory, the one or more MVLAN IDs representing a combination of all of the VLAN designations associated with the subscribing entities for each group destination address, except for the VLAN designation associated with the sourcing entity;

means for propagating the one or more MVLAN IDs and corresponding VLAN designations across the network such that the network associates each MVLAN ID with at least some of the subscribing entities; and in response to receiving a multicast message with the given group destination address at the MND, means for attaching the one or more previously generated and propagated MVLAN IDs for that group destination address to a copy of the message and distributing each copy to the subscribing entities.

2. The MND of claim 1 wherein the generating means comprises at least one multicast VLAN tag source configured to contain one or more MVLAN IDs available for selection.

3. The MND of claim 2 further comprising a table configured to contain the one or more MVLAN IDs and the corresponding VLAN designations and accessible by the attaching means for locating the MVLAN IDs for the given group destination address.

4. The MND of claim 3 wherein the attaching means includes means for accessing the memory to establish a list of VLAN designations for the given group destination address and means for locating the one or more MVLAN IDs in the table corresponding to the list of VLAN designation.

5. The MND of claim 4 wherein the propagating means includes means for generating and transmitting advertisements across the network, each advertisement having one VLAN designation and including at least one MVLAN ID associated with that VLAN designation.

6. The MND of claim 5 wherein the network includes a plurality of intermediate devices coupled to the MND and the entities, some of the intermediate devices comprising means for associating the entities with one or more VLAN designations and means for receiving the advertisements so as to associate at least some of the subscribing entities with the one or more MVLAN IDs.

7. The MND of claim 6 wherein a first intermediate device adjacent to the sourcing entity receives the multicast message, attaches the one or more VLAN designations associated with the sourcing entity to the multicast message and forwards the message to the MND and the attaching means includes means for replacing the previously attached one or more VLAN designations with the one or more MVLAN IDs corresponding to the group destination address of the message.

8. A method for efficiently distributing multicast messages across a computer network having a plurality of entities including at least one sourcing entity for transmitting a multicast message with a given group destination address and one or more subscribing entities for receiving the message, the network capable of associating the entities with one or more virtual local area network (VLAN) designations, the method comprising the steps of:

attaching the one or more VLAN designations associated with the sourcing entity to the multicast message;

distributing the multicast message across the network so that the message may be delivered to at least one multicast network device (MND) and all subscribing entities sharing the same one or more VLAN designations as the sourcing entity;

generating a Multicast VLAN (MVLAN) identifier (ID), the MVLAN ID representing taco or more of the VLAN designations associated with the subscribing entities for the given group destination address, except for the one or more VLAN designations associated with the sourcing entity;

propagating the MVLAN ID and corresponding VLAN designations across the network such that the network associates the MVLAN ID with at least some of the subscribing entities; and in response to receiving a multicast message with the given group destination address at the MND, replacing the previously attached one or more VLAN designations with the previously generated and propagated MVLAN ID for the given group destination address and distributing the message to at least some of the subscribing entities associated with a VLAN designation other than the VLAN designation previously attached to the message.

9. The method of claim 8 further comprising the step of maintaining a memory configured to pair the given group destination address with the VLAN designations associated with some of the subscribing entities and the step of generating the MVLAN ID is in response to the information contained in the memory.

10. The method of claim 9 wherein the memory is configured in response to subscription requests and cancellations received from subscribing entities.

11. The method of claim 10 wherein the step of generating an MVLAN ID includes the step of selecting an available MVLAN ID from a multicast VLAN tag source configured to contain a plurality of unique MVLAN IDs.

12. The method of claim 11 further comprising the step of configuring a table to contain the generated MVLAN ID with the corresponding two or more VLAN designations.

13. The method of claim 12 wherein the network further includes means for executing a spanning tree algorithm and the method further comprising the step configuring the spanning tree algorithm to define a single, loop-free path connecting each entity associated with a given VLAN designation.

14. The method of claim 13 further comprising the step of further configuring the spanning tree algorithm to define a single, loop-free path connecting each entity associated with the two or more VLAN designations representing the MVLAN ID.

15. A computer readable medium containing executable program instructions for efficiently distributing multicast messages across a computer network having a plurality of entities including at least one sourcing entity for transmitting a multicast message with a given group destination address and one or more subscribing entities for receiving the message, the network capable of associating the entities with one or more virtual local area network (VLAN) designations, the method comprising the steps of:

attaching the one or more VLAN designations associated with the sourcing entity to the multicast message;

distributing the multicast message across the network so that the message may be delivered to at least one multicast network device (MND) and all subscribing entities sharing the same one or more VLAN designations as the sourcing entity;

generating a Multicast VLAN (MVLAN) identifier (ID), the MVLAN ID representing two or more of the VLAN designations associated with the subscribing entities for each group destination address, except for the one or more VLAN designations associated with the sourcing entity;

propagating the MVLAN ID and corresponding VLAN designations across the network such that the network associates the MVLAN ID with at least some of the subscribing entities; and in response to receiving a multicast message with the given group destination address at the MND, replacing the previously attached one or more VLAN designations with the previously generated and propagated MVLAN ID for the given group destination address and distributing the message to at least some of the subscribing entities associated with a VLAN designation other than the VLAN designation previously attached to the message.

16. A network segment providing efficient distribution of multicast messages, the network segment comprising:

a host entity on a local area network (LAN), the host entity including means for sourcing a multicast message having a given group destination address;

a plurality of subscribing entities;

at least one multicast network device (MND);

one or more intermediate devices, interconnecting the host, subscribing entities and MND and comprising:
  means for associating the host and subscribing entities with one or more virtual local area network (VLAN) designations;
  means for attaching a VLAN designation to the multicast message sourced by the host entity; and
  means for distributing the multicast message across the network segment and for delivering the message to the at least one MND and to all subscribing entities sharing the same one or more VLAN designations as the sourcing entity;

a memory containing information regarding the VLAN designations associated with the entities subscribing to multicast messages with the given group destination address;

means for generating one or more Multicast VLAN (MVLAN) identifiers (IDs) in response to the information contained in the memory, the one or more MVLAN IDs representing a combination of all of the VLAN designations associated with the subscribing entities for each group destination address, except for the VLAN designation associated with the sourcing entity;

means for propagating the one or more MVLAN IDs and corresponding VLAN designations across the network such that the network associates each MVLAN ID with at least some of the subscribing entities; and in response to receiving a multicast message with the given group destination address at the MND, means for attaching the one or more previously generated and propagated MVLAN IDs for that group destination address to a copy of the message and distributing each copy to the subscribing entities.

17. A method for efficiently distributing multicast messages across a computer network having a plurality of entities including at least one sourcing entity for transmitting a multicast message with a given group destination address, one or more subscribing entities for receiving the message, a plurality of intermediate devices and at least one multicast network device (MND), the network capable of associating the entities with one or more virtual local area network (VLAN) designations such that one or more VLAN designations are associated with the sourcing entity, the method comprising the steps of:

generating, at the MND, a Multicast VLAN (MVLAN) identifier (ID), the MVLAN ID representing two or more of the VLAN designations associated with the subscribing entities for the given group destination address, except for the one or more VLAN designations associated with the sourcing entity; and propagating the MVLAN ID and corresponding VLAN designations across the network such that one ore more of the intermediate devices associates the MVLAN ID with at least some of the subscribing entities.

18. The method of claim 17 wherein the step of generating the MVLAN ID includes the step of selecting an available MVLAN ID from a multicast VLAN tag source configured to contain a plurality of MVLAN IDs.

19. Ache method of claim 18 wherein the step of propagating the MVLAN ID includes the step of generating and transmitting advertisements across the network, each advertisement having a VLAN designation and including at least one MVLAN ID associated with the VLAN designation.

20. A method for efficiently distributing multicast messages across a computer network having a plurality of entities including at least one sourcing entity for transmitting a multicast message with a given group destination address and one or more subscribing entities for receiving the message, the network capable of associating the entities with one or more virtual local area network (VLAN) designations such that one or more VLAN designations associated with the sourcing entity are appended to the multicast message, the network further including a plurality of intermediate devices and at least one multicast network device (MND) configured to generate and propagate across the network a Multicast VLAN (MVLAN) identifier (ID) that represents two or more of the VLAN designations associated with the subscribing entities, except for the one or more VLAN designations associated with the sourcing entity such that one or more of the intermediate devices associates the MVLAN ID with at least some of the subscribing entities, the method comprising the steps of:

in response to receiving a multicast message with the given group destination address at a first intermediate device, replacing the previously appended one or more VLAN designations with the previously generated and propagated MVLAN ID for the given group destination address; and forwarding the message with the MVLAN ID to at least some of the subscribing entities.

21. A multicast network device (MND) for use in efficiently distributing multicast messages across a computer network having a plurality of entities including at least one sourcing entity for transmitting a multicast message with a given group destination address, one or more subscribing entities for receiving the message and a plurality of intermediate devices, the network capable of associating the entities with one or more virtual local area network (VLAN) designations, the MND comprising:

a memory containing information regarding the VLAN designations associated with the entities subscribing to multicast messages with the given group destination address;

means for generating one or more Multicast VLAN (MVLAN) identifiers (IDs) in response to the information contained in the memory, the one or more MVLAN IDs representing a combination of two or more of the VLAN designations associated with the subscribing entities for each group destination address, except for the one or more VLAN designations associated with the sourcing entity; and means for propagating the one or more MVLAN IDs and corresponding VLAN designations across the network-such that one or more of the intermediate devices associates each MVLAN ID with at least some of the subscribing entities.

22. The MND of claim 21 wherein the generating means comprises at least one multicast VLAN tag source configured to contain a plurality of MVLAN IDs available for selection.

23. The MND of claim 22 wherein the propagating means includes means for generating and transmitting advertisements across the network, each advertisement having a VLAN designation and including at least one MVLAN ID associated with the VLAN designation.

24. In a computer network having a plurality of entities including at least one sourcing entity for transmitting a multicast message with a given group destination address and one or more subscribing entities for receiving the message, the network capable of associating the entities with one or more virtual local area network (VLAN) designations, the network further including at least one multicast network device (MND) configured to generate and propagate one or more Multicast VLAN (MVLAN) identifiers (IDs) each representing a combination of two or more of the VLAN designations associated with the subscribing entities, except for the one or more VLAN designation associated with the sourcing entity, an intermediate device comprising:

means, responsive to receiving a multicast message with the given group destination address, for appending a previously generated and propagated MVLAN ID for that group destination address to a copy of the message; and means for forwarding the message copy having the MVLAN ID to at least some of the subscribing entities.

25. In a computer network having a plurality of entities including at least one sourcing entity for transmitting a multicast message with a given group destination address and one or more subscribing entities for receiving the message, the network capable of associating the entities with one or more virtual local area network (VLAN) designations, a multicast message received and stored by an intermediate device, the multicast message comprising:

a destination address corresponding to the given group destination address; and a Multicast VLAN (MVLAN) identifier (ID) that represents a combination of two or more of the VLAN designations associated with the subscribing entities for the given group destination address, except for the one or more VLAN designations associated with the sourcing entity, wherein the MVLAN ID replaces the one or more VLAN designations associated with the sourcing entity.

26. In a computer network having a plurality of entities including at least one sourcing entity for transmitting a multicast message with a given group destination address and one or more subscribing entities for receiving the message, the network capable of associating the entities with one or more virtual local area network (VLAN) designations, a multicast message received and stored by an intermediate device, the multicast message comprising:

a destination address corresponding to the given group destination address;

a Multicast VLAN (MVLAN) identifier (ID) that represents a combination of two or more of the VLAN designations associated with the subscribing entities for the given group destination address, except for the one or more VLAN designations associated with the sourcing entity; and one or more VLAN designations associated with the sourcing entity.

27. In a computer network having a plurality of entities including at least one sourcing entity for transmitting a multicast message with a given group destination address and one or more subscribing entities for receiving the message, the network capable of associating the entities with one or more virtual local area network (VLAN) designations, the network further including at least one multicast network device (MND) configured to generate and propagate advertisements for one or more Multicast VLAN (MVLAN) identifiers (IDs), each MVLAN ID representing a combination of two or more of the VLAN designations associated with the subscribing entities, except for the one or more VLAN designation associated with the sourcing entity, an intermediate device comprising:

a plurality of ports providing connectivity to the network;

means for associating one or more ports with one or more VLAN designations, including a first VLAN designation;

means for identifying ports in communication with at least one subscribing entity; and means, responsive to receiving an advertisement associating a first MVLAN ID with the first VLAN designation, for associating the first MVLAN ID with those ports that are associated with the first VLAN designation.

28. The intermediate device of claim 27 further comprising means, responsive to receiving a first multicast message with the first MVLAN ID, for forwarding the first multicast message onto those ports that are both associated with the MVLAN ID and in communication with at least one subscribing entity.

29. The intermediate device of claim 28 further comprising means, responsive to receiving a second multicast message on a port associated with a second VLAN, for forwarding the second multicast message onto those ports that are both associated with the second VLAN and in communication with at least one subscribing entity.

* * * * *